United States Patent [19]
Pruitt et al.

[11] Patent Number: 5,279,100
[45] Date of Patent: Jan. 18, 1994

[54] SELF-LATCHING SHIELD CURTAIN FOR CROP HARVESTERS

[75] Inventors: Martin E. Pruitt, Hesston; Galen C. Doud, Newton, both of Kans.

[73] Assignee: Hay & Forage Industries, Hesston, Kans.

[21] Appl. No.: 949,060

[22] Filed: Sep. 22, 1992

[51] Int. Cl.$^5$ .................. A01D 75/18; A47H 23/01
[52] U.S. Cl. .................................... 56/1; 24/303; 56/320.1; 56/DIG. 24; 160/349.1
[58] Field of Search .............. 56/1, 320.1, DIG. 24; 24/303; 160/349.1, 349.2, 184; 180/851

[56] References Cited

U.S. PATENT DOCUMENTS

| | | | |
|---|---|---|---|
| 2,319,292 | 5/1943 | Boggs | 24/303 X |
| 2,992,466 | 7/1961 | Gallagher | 24/303 |
| 3,027,701 | 4/1962 | Campbell | 56/157 |
| 3,306,015 | 2/1967 | Myers | 56/504 X |
| 5,143,137 | 9/1992 | West | 160/199 |
| 5,148,580 | 9/1992 | Dyckow | 24/303 |

Primary Examiner—David J. Bagnell
Attorney, Agent, or Firm—Hovey, Williams, Timmons & Collins

[57] ABSTRACT

The high speed rotary cutter bed of a harvester or other mowing machine has a rubberized deflector curtain that wraps around opposite ends and front extremities of the cutter bed to guard against thrown objects, yet permit the ingress of standing crop materials as the machine is advanced. The curtain is divided into a series of discrete sections which mutually overlap along their upright marginal edges so as to permit independent raising and lowering of the curtain sections with their respective, overhead rigid covers into positions permitting access to the cutter bed for maintenance or other purposes. Self-actuating retainer means in the form of magnetically attracted components on the marginal overlapping portions of the curtain sections cause the sections to be automatically readhered together into an effective single deflector curtain around the cutter bed when the curtains are down in their operating positions, yet allow the curtain sections to automatically release from one another when their respective cover sections are raised to their access positions.

7 Claims, 1 Drawing Sheet

SELF-LATCHING SHIELD CURTAIN FOR CROP HARVESTERS

TECHNICAL FIELD

This invention relates to harvesting equipment and, more particularly, to the cutter mechanism of such a machine and the protective deflector curtain that surrounds the high speed, rotating parts thereof to guard against thrown objects.

BACKGROUND

It is well known in the industry to provide rubberized deflector curtains or skirts around the high speed, rotary cutters of agricultural mowers and harvesting machines to guard against the risk of thrown objects. Typically, such curtains are formed by a plurality of separate, individual hanging sections that are attached to respective rigid covers or shields that may be swung individually up into raised positions for access to the cutting mechanism therebeneath. When the shields are down in their normal covering positions, the curtain sections overlap one another to a slight extent along their lateral margins to avoid the formation of gaps through which thrown objects would pass.

However, as the machines move through standing crops, the individual curtain sections are engaged and pushed rearwardly by the crops such that there is a tendency for the sections to come open as they deflect and separate from one another. Thus, a common practice has been to provide various snaps, buckles and other fasteners that prevent the sections from separating from one another during actual field operations. When the farmer then wants to lift one or more of the rigid shields to gain access to the cutting mechanism for repair or replacement purposes, he must first release the appropriate fasteners.

Of course, for optimum safety, the farmer should then rebuckle or resecure the fasteners once the raised shield is lowered back down into operating position. However, as a practical matter, this extra step is sometimes ignored by the user such that the curtain sections become free to swing open relative to one another during actual field operation.

SUMMARY OF THE PRESENT INVENTION

Accordingly, one important object of the present invention is to provide a deflector curtain of the foregoing type which is arranged in sections so as to permit individual raising and lowering of the rigid shields between access and operating positions, yet which automatically reconnects its separate curtain sections into an effective common, single expanse of curtain when a raised shield and its attached curtain section are lowered back down into the operating position. In other words, an important object of this invention is to provide a passive interlock system for the curtain sections that automatically reestablishes retained closure of the curtain sections when the shield or shields are returned to their operating positions, without the need for intentional interaction and involvement by the operator himself.

In carrying out these objectives, the present invention contemplates the use of magnetic fastener components arranged on overlapping margins of adjacent curtain sections in such a manner that when the curtain sections are in their usual upright and mutually overlapped positions, the magnetic components of two adjacent sections attract one another and become releasably interengaged. One of the components comprises a permanent magnet and the other is preferably a larger, plate-like component of cold rolled steel, the strength of the permanent magnet being such that while it will hold the curtain sections together while they are pushed and pressured by the standing crop materials and buffeted by strong air currents created by the high speed cutting mechanism, it will also allow the sections to separate as they are peeled or pulled from one another during raising of one or more of the shields into its access position.

DETAILED DESCRIPTION

Figure 1:
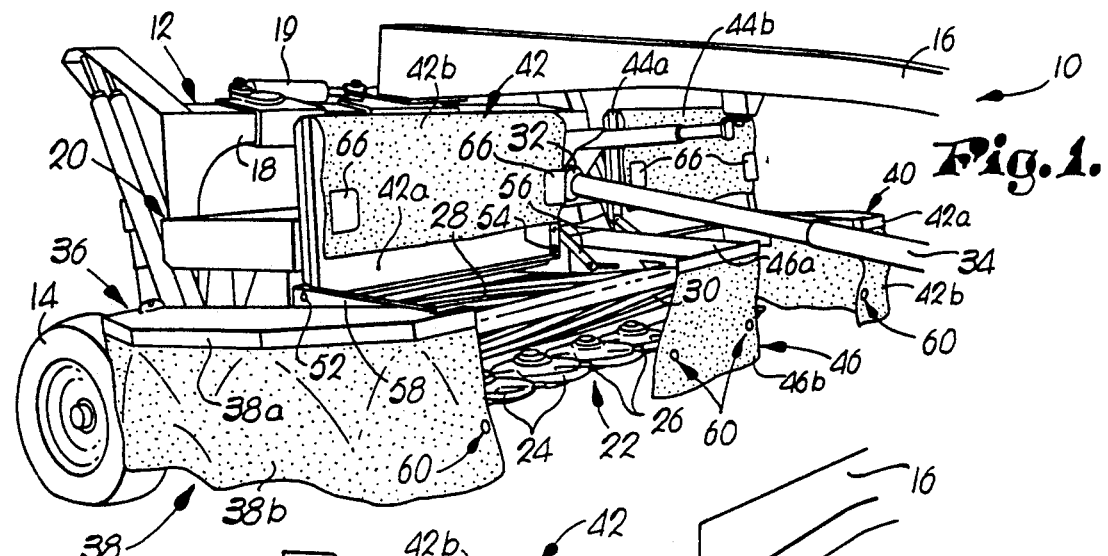
FIG. 1 is a right front perspective view of a harvester employing a self-latching, sectional deflector curtain in accordance with the principles of the present invention, certain of the overhead cover shields of the machine being raised into access positions for illustration purposes.

The harvester 10 illustrated in FIG. 1 takes the form of a mechanical drive, center pivot mower-conditioner of the type described and claimed in co-pending application 07/868,532 filed Apr. 14, 1992, in the names of Martin E. Pruitt, et al., and assigned to the assignee of the present invention. Although the present invention has been illustrated and will be hereinafter described in connection with that particular type of harvester, it will be appreciated that the principles of the present invention may be applied to many different types and styles of crop cutting machines where deflector curtains are useful.

The machine 10 includes an inverted, generally U-shaped, transverse frame 12 having ground wheels 14 (only one being shown) at opposite ends of the frame. A pull tongue 16 is pivotally attached to a horizontal crossbeam 18 of the frame 12 near the center of the beam 18 for horizontal swinging movement about an upright axis. A hydraulic cylinder 19 interconnects the crossbeam 18 and the rear of the tongue 16 for causing selective swinging movement of the tongue 16 whereby to vary the lateral position of the machine relative to a towing vehicle (not shown) as the machine is pulled through a field. The tongue 16 is adapted at its forward end for attachment to the towing vehicle.

The frame 12 supports a harvesting header 20 in front of the crossbeam 18 and below the tongue 16 for performing harvesting operations on a crop as the machine 10 is pulled through a field. The header 20 includes a transverse cutter bed 22 across the lower front extremity of the header that comprises cutting mechanism for severing standing crop material from the ground as the machine is advanced. In the illustrated embodiment, the cutter bed 22 includes a series of high speed, rotary disc cutters 24 provided with flail knives 26 as well understood by those skilled in the art. As the crops are severed by the cutter bed 22, they are flung rearwardly into a pair of superimposed, cooperating conditioner rolls 28 and 30 that crimp the stems of the harvested crops to promote more rapid drying and which project the conditioned materials out the rear of the machine into either a windrow or a swath, depending upon how the farmer has adjusted certain discharge baffles (not shown) behind the conditioning rolls 28,30. Both the cutter bed 22 and the conditioner rolls 28,30 derive their driving power from a mechanical drive train that includes a gear box 32 beneath the tongue 16 and a long, fore-and-aft extending mechanical drive line 34 leading from the gear box 32 to the power takeoff shaft of the towing vehicle.

Figure 2:
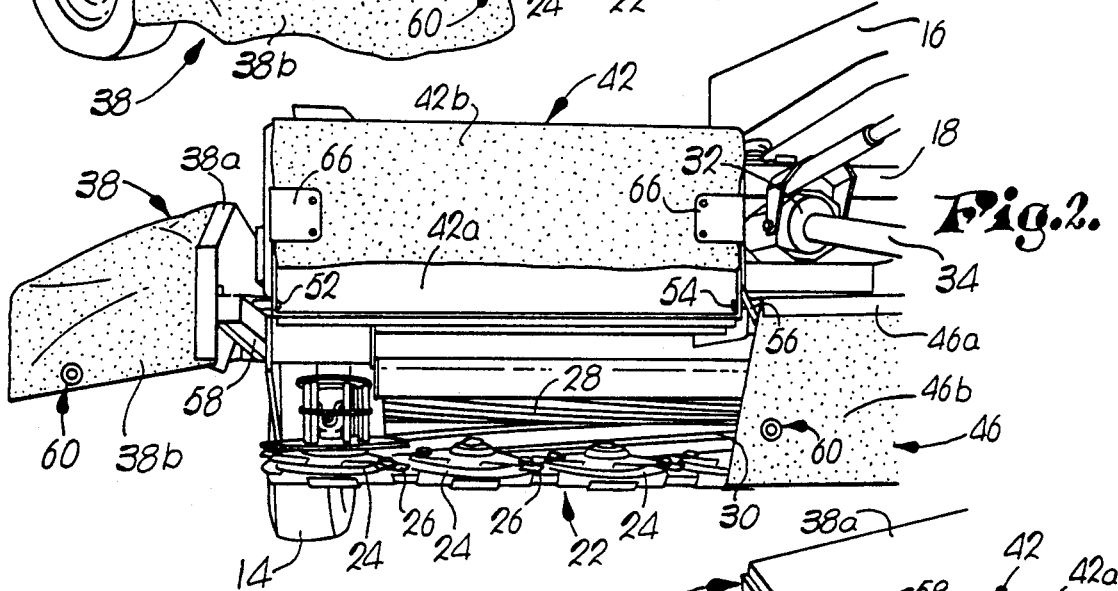
FIG. 2 is a fragmentary front perspective view of the right front corner of the machine with both the outboard cover shield and the next inboard cover shield raised into access positions.

In accordance with the present invention, the harvesting header 20 also includes a shield assembly broadly denoted by the numeral 36 that protectively houses and encloses the cutter bed 22 without impeding free access thereto by standing crop materials as the machine is placed in service. In the illustrated embodiment, the shield assembly 36 includes a pair of opposite end shield units 38,40 situated at opposite ends of the cutter bed 22 outboard of the wheels 14, a pair of front shield units 42 and 44 located immediately inboard of the respective end units 38,40, and a center shield unit 46 located centrally between the two front units 42 and 44. All of the units 38,40,42, and 44 may be raised and lowered between operating and access positions, as illustrated in FIGS. 1 and 2; however, the center shield unit 46 is designed to remain down in its illustrated operating position and may not be raised due to the presence of the overhead drive line 34.

All five of the shield units are broadly similar in the sense that they each include a rigid, sheet metal cover portion that normally overlies or is at least at a level higher than the cutter bed 22, and a flexible hanging curtain portion that is either located in front of the cutter bed 22 or off to the side thereof, depending upon which of the shield units is being considered. Thus, using the front shield unit 42 as an example, it will be seen that the unit includes a flat, rigid sheet metal cover 42a that is normally down in an operating position as in FIG. 3 in which it overlies the cutter bed 22. A rectangular, flexible deflector curtain 42b hangs from the cover 42a along its outer front edge so as to be spaced forwardly from the cutter bed 22 when the cover 42a is in its lowered position of FIG. 3. The curtain 42b is dimensioned to have its lower edge spaced above the surface of the ground when the cover 42a is lowered. As illustrated best in FIGS. 1 and 2, the cover 42a has a pair of aligned, transverse pivots 52 and 54 that permit the cover 42a to swing between its alternate positions, there being one or more releasable strut mechanisms 56 for releasably holding the cover 42a upright when it is in its raised position of FIGS. 1 and 2. When the cover 42a is lowered into its horizontal position of FIG. 3, it comes to rest upon suitable ledges or other support structure not illustrated in the Figures.

As mentioned above, the end units 38 and 40 are of similar construction to the front unit 42, having respective rigid covers 38a, 40a, and respective deflector curtain sections 38b and 40b. As illustrated, although the curtain sections 38b and 40b are rectangular like the curtain section 42b of front unit 42, the end curtain sections 38b,40b are curved out of single upright planes as they extend generally fore-and-aft along opposite ends of the machine and then wrap around the front corners of the machine to a point of overlap with the curtain sections of the front units 42,44. Each of the end covers 38a,40a is raisable into an access position, as illustrated with respect to the end unit 38 in FIG. 2, by virtue of suitable pivot means (not shown) associated with a fore-and-aft extending cantilevered support arm 58 at each end of the header 20.

Like the units 38,40,42, and 44, the center shield unit 46 has a rigid sheet metal cover 46a and a flexible curtain section 46b. However, as mentioned above, the center unit 46 is stationary and may not be raised to an access position like the other units.

Figure 3:
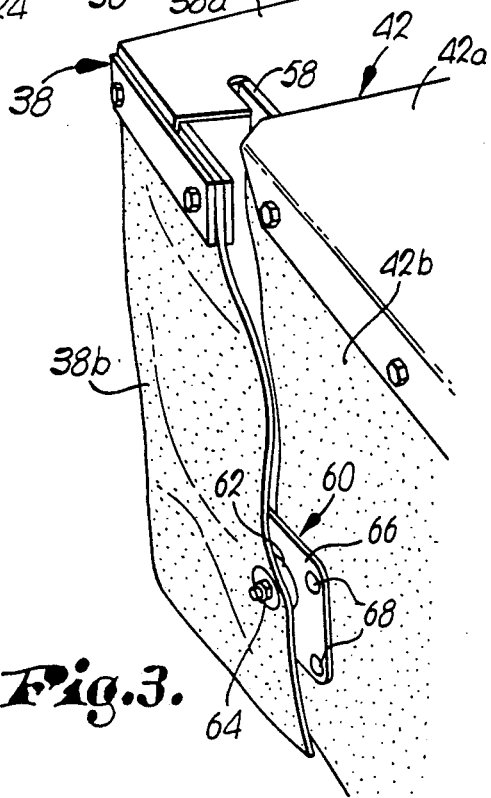
FIG. 3 is an enlarged, fragmentary top front perspective view of the right front corner of the shield and curtain assembly of the machine showing adjacent curtain sections secured together by the self-actuating retainer means of the present invention.

The shield units 38–46 are so designed that when all of the units are down in their operating positions, the various curtain sections mutually overlap along their lateral margins and present an essentially continuous, common curtain around the front and sides of the machine. It will be noted in this respect that the curtain sections 38b and 40b, at the point where they wrap around the front corner of the machine, are spaced slightly farther forwardly than the two front curtain sections 42b and 44b. Thus, as illustrated in FIG. 3, the end curtain sections 38b or 40b slightly overlap and lie in front of the next adjacent front curtain sections 42b and 44b. Likewise, the center shield unit 46 is so designed that the curtain section 46b thereof hangs slightly further forward than the two adjacent front curtain sections 42b and 44b. Thus, the side margins of the center curtain section 46b are disposed in forwardly overlapped relationship with corresponding side margins of the front curtain sections 42b and 44b.

Figure 5:
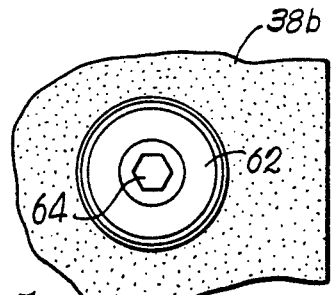
FIG. 5 is a fragmentary elevational view of the inside face of the permanent magnet which forms a part of the retainer components of FIGS. 3 and 4.

In order to hold the curtain sections together during field operations, yet permit their separation when one or more of the covers are raised into access positions, the curtain sections are provided with self-actuating releasable retainer means broadly denoted by the numeral 60. In the illustrated embodiment, each retainer means 60 includes a pair of cooperating components at each zone of marginal overlap between adjacent curtain sections. Thus, in the illustrated embodiment, four individual sets of paired components are provided at the four zones of marginal overlap of the curtain sections, i.e., at the overlap of the right end certain section 38b with the front curtain section 42b, the overlap zone between the center curtain section 46b and the front curtain section 42b, the overlap zone between the center curtain section 46b and the other front curtain section 44b, and the marginal zone of overlap between the left end curtain section 40b and the left front curtain section 44b. Each of the four sets of retainer means 60 includes a permanent magnet 62 secured to the inner face of the outer overlapping curtain section such as the end curtain section 38b in FIGS. 3, 4, and 5. The magnet 62 is preferably circular in configuration and is secured to the corresponding curtain section by a bolt and nut assembly 64.

Figure 4:
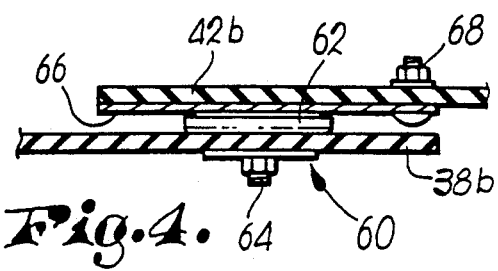
FIG. 4 is an enlarged, fragmentary transverse cross-sectional view through the self-actuating retainer magnets and their associated curtain sections to reveal details of construction.

The other component of each retainer means 60 comprises a flat, rectangular plate 66 of cold rolled steel or other ferromagnetic material, such plate 66 being approximately twice as large in surface area as the magnet 62 and being secured to the outer face of an inwardly disposed curtain section such as the section 42b in FIGS. 3 and 4. Each of the plates 66 is secured to its corresponding curtain section by a pair of nut and bolt assemblies 68. It will be noted that each of the front curtain sections 42b and 44b has a pair of the plates 66 at its opposite margins, while the center curtain section 46b has a pair of the magnets 62. On the other hand, the end curtain sections 38b and 40b are provided with only a single magnet 62.

Preferably, the curtain sections 38b-46b are constructed from sheets of rubberized or vinyl material with fabric layers sandwiched between the layers of vinyl or rubber. One such suitable type of material is available from the Wahpeton Canvas Company of Wahpeton, N.D., and comprises a rubber coated, single ply of 16 to 25 oz. polyester fabric. The permanent magnets 62 may be obtained from General Tools Manufacturing Company, of New York, N.Y., as 35 lb. pull magnets. The plates 66 are perhaps most easily fabricated from sheet stock of cold rolled steel.

Operation

It should be apparent from the foregoing that by virtue of the cooperating magnets 62 and plates 66, the various curtain sections 38b-46b are releasably held in an interlocked or joined together condition whenever two adjacent curtain sections are in their lowered positions so they marginally and mutually overlap one another. When all of the curtain sections are fully lowered, there is presented, in effect, a closed, single deflector curtain which starts at the rear of one end of the machine and wraps completely round the front of the machine until reaching the opposite rear corner just in front of the ground wheel 14. Thus, the solid covers 38a-46a seal the cutter bed 22 from the top while the wrap-around curtain that is effectively presented by the layered curtain sections 38b-46b seals the front and ends of the machine.

Yet, as the machine is pulled through the field of standing crop, the crop materials can deflect the expanse of curtain rearwardly without separating the curtain sections from one another and to a sufficient extent as to enable the cutter bed 22 to engage and sever the crop materials. Furthermore, in the event the operator needs to turn off the machine and gain access to the cutter bed 22 or other areas encompassed by the shield assembly 36, he need only raise the appropriate cover 38a, 40a, 42a, or 44a as illustrated in FIGS. 1 and 2, whereupon the involved magnets 62 and plates 66 will slide out of contacting engagement with one another and permit the desired raising action to occur.

Significantly, when the raised cover is then returned to its lowered operating position, the affected curtain sections inherently return to their mutually over-lapped conditions such that the involved magnetic components of the retainer means 60 are brought into re-registration with another to immediately become reengaged, all without intentional manipulation by the operator. The operator need not refasten any buckles, snap any snaps, or otherwise manipulate fasteners to reestablish closure of the deflector curtain, all of which promotes continued closure of the curtain during subsequent operation of the machine.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

We claim:

1. In a mowing machine having support structure and a protective curtain assembly hanging from said structure for cutting mechanism of the machine, the improvement comprising:
    said support structure including at least a pair of supports, at least one of which may be raised and lowered relative to the cutting mechanism,
    said curtain assembly including at least a pair of side-by-side, slightly mutually overlapped curtain sections carried by respective supports of said support structure,
    said one support and its curtain section being raisable into an access position in which the curtain section of the raised support is out of overlapped relationship with the other curtain section of the pair, exposing the cutting mechanism; and
    self-actuating retainer means disposed for automatically releasably holding the pair of curtain sections joined together when the one support is lowered and the pair of curtain sections are in their mutually overlapped relationship and for automatically releasing the pair of curtain sections from one another when the one support is raised to its access position.

2. In a mowing machine as claimed in claim 1,
    said retainer means comprising a pair of magnetically mutually attracted components on opposite ones of said curtain sections in disposition for cooperative registration with one another when the curtain sections are in their overlapped relationship.

3. In a mowing machine as claimed in claim 2,
    said pair of components comprising a permanent magnet on said one curtain section and a ferromagnetic plate on the other.

4. In a moving machine as claimed in claim 3,
    said one, raisable support comprising an overhead, raisable cover for the cutting mechanism spaced above the latter.

5. In a mowing machine as claimed in claim 4, said cover extending in a generally horizontal plane when lowered, and being provided with a front extremity,
    the curtain section of the raisable cover being secured thereto at said front extremity.

6. In a mowing machine as claimed in claim 1,
    said one, raisable support comprising an overhead, raisable cover for the cutting mechanism spaced above the latter.

7. In a mowing machine as claimed in claim 6,
    said cover extending in a generally horizontal plane when lowered, and being provided with a front extremity,
    the curtain section of the raisable cover being secured thereto at said front extremity.

* * * * *